Jan. 5, 1960        H. M. PARKER        2,919,583

MAGNETICALLY SUPPORTED GYROSCOPE

Filed May 29, 1958        2 Sheets-Sheet 1

INVENTOR
HERMON M. PARKER

BY

ATTORNEYS

Jan. 5, 1960  H. M. PARKER  2,919,583
MAGNETICALLY SUPPORTED GYROSCOPE
Filed May 29, 1958  2 Sheets-Sheet 2

INVENTOR
HERMON M. PARKER

United States Patent Office 2,919,583
Patented Jan. 5, 1960

2,919,583

MAGNETICALLY SUPPORTED GYROSCOPE

Hermon M. Parker, Charlottesville, Va., assignor, by mesne assignments, to the United States of America as represented by the Secretary of the Navy Application May 29, 1958, Serial No. 738,900

11 Claims. (Cl. 74—5)

The present invention relates to means for magnetically supporting a body in space, and more particularly to a three-dimensional, frictionless means for supporting the rotor of a gyroscope.

The problem of obtaining increased sensitivity in a gyroscope is essentially one of reducing inherent drift in the gyroscope components. It is evident that to obtain the theoretical limit of drift established by natural Brownian motion "noise," all moments acting upon the rotor must be reduced to a minimum. The closest approach to the solution of this problem may be found in Patent No. 2,691,306, issued to J. W. Beams, which discloses a system for magnetically suspending a rotor in a vacuum, wherein bearing and air friction are eliminated for all practical purposes. However, the device of Beams has serious drawbacks which make it generally unsuitable for most gyroscope applications, the most obvious of which are the lack of means to counteract accelerations other than in the vertical direction, and no provisions for accurately determining the orientation of the axis of rotation of the gyroscope in space.

One object of the present invention is to provide a magnetic means capable of maintaining an object in a suspended position regardless of orientation of the supporting means.

Another object of the invention is to provide a means for freely suspending a body in space regardless of the direction of lateral, vertical or rotational accelerations imposed.

A further object of the invention is to provide means for determining the axis of rotation of the rotor of a gyroscope freely suspended in space.

Another object is to suspend the rotor of a gyroscope in a magnetic field regardless of the direction of rotation relative to the field.

Still another object of the invention is to provide an accelerometer capable of indicating the orthogonal components of acceleration regardless of direction.

Figure 1:
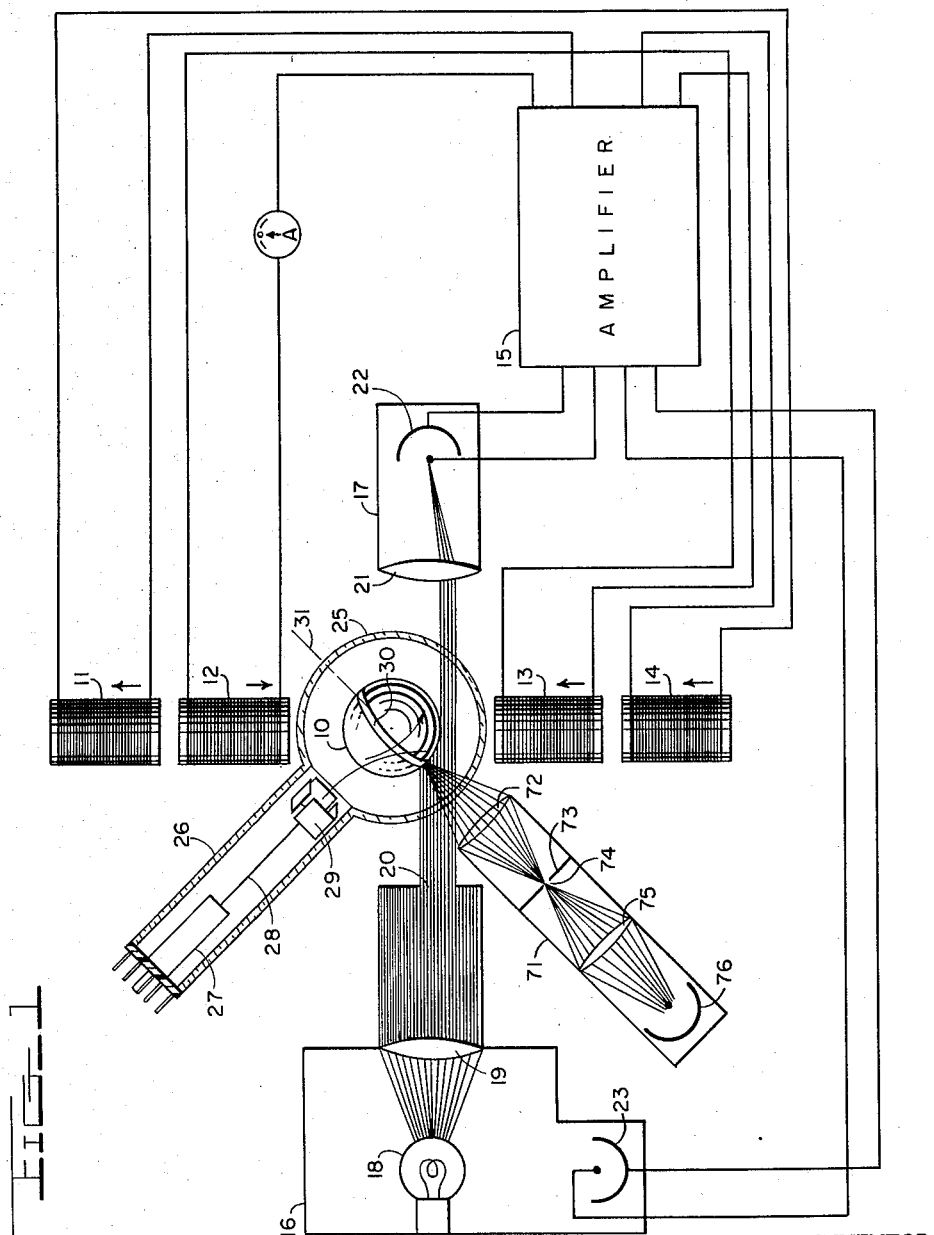
Figure 2:
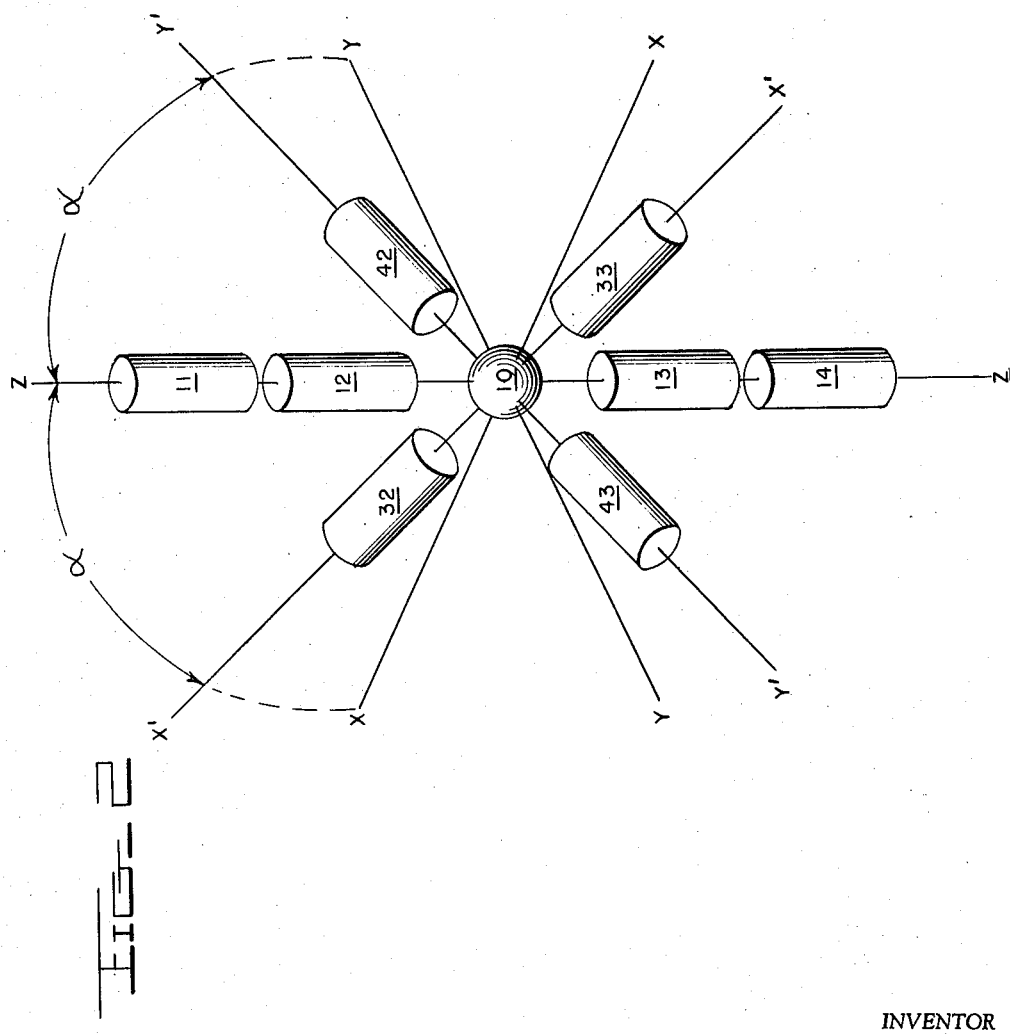

Other objects will become apparent from the disclosure of the invention in connection with the drawings in which Fig. 1 shows the structure for controlling the position of the suspended rotor in one direction;

Fig. 2 is a perspective representation of the coil arrangement for three-dimensional positioning of the rotor.

A symmetrical steel rotor spinning about a vertical axis while magnetically suspended in a vacuum will lose angular velocity at a remarkably slow rate which can be completely attributed to the gaseous friction of the rarefied surroundings as computed from kinetic theory considerations. On the other hand, if such a solid steel rotor is set in rotation about an axis not parallel to the axis of the supporting field, then both magnetic and eddy current loss phenomena arise resulting in torques which cause the spin axis of the rotor to immediately align itself with the field axis. These factors prevent the use of such a device as a gyroscope for continuously indicating orientation in many applications, for instance, in a maneuvering aircraft. For such applications it is desirable to have a gyroscope wherein the rotor might be set in rotation about any axis in space and this axis would remain fixed in space with time regardless of its orientation with the supporting field axis.

In order to construct such a gyroscope it is necessary to eliminate all phenomena in the rotor which tend to cause some change in the orientation of its initially established axis of rotation. Such phenomena include any process which could impose a torque on the rotor about any axis other than that about which it rotates, for example (1) Rotational hysteresis losses.
(2) Eddy current losses.
(3) Physical inhomogeneity of the rotor material.
(4) Magnetic anisotropy within the rotor.
(5) Asymmetry of the rotor.
(6) Magneto-elastic or magnetostrictive effects.
(7) Magnetization of the rotor due to its rotation (Barnett effect).
(8) Inhomogeneity of the supporting field.

Rotational hysteresis loss is defined as the net energy loss when a disc of the material is rotated about its cylindrical axis in a uniform magnetic field parallel to the plane of the disc. This loss can be minimized by constructing the rotor of low loss ferromagnetic materials, such as certain ferrites which saturate a relatively low field strength, and operating it in a magnetic supporting field of sufficient strength to approach complete magnetic saturation.

Eddy current losses can be reduced to a negligible value by employing rotor materials having resistivities of the order of $10^5$ ohm-cm. or larger, and single crystal size less than 6 micron for a sphere of ½ inch diameter.

Physical inhomogeneity, magnetic anisotropy, and asymmetry should be substantially eliminated by proper manufacturing processes in construction of the rotor. Magneto-elastic and magnetostrictive effects can be avoided by proper selection of rotor materials, magnetization due to rotation is a second order effect which can be neglected for practical purposes and the supporting field can be made reasonably homogeneous with little difficulty.

In order to maintain the rotor in a magnetically saturated condition and also be able to control its position, it is necessary that the strength of the magnetic field and the gradient be capable of independent control.

It can be readily shown that in the basic principle of the magnetic support apparatus, the weight, $mg$, of the magnetically suspended rotor is balanced by an upward force which is approximately equal to $\vec{M}.dH/dz$, where $\vec{M}$ is the dipole magnetic moment of the rotor and $dH/dz$ represents the vertical component of the gradient of the supporting field. Below saturation $\vec{M}$ is itself proportional to the supporting field intensity, $H$, and since $mg$ is essentially a constant, it is at once apparent that to maintain support, the intensity of the supporting field cannot be changed without a simultaneous change in the gradient of the field. Most magnetic support circuits use a simple solenoid for a supporting coil and hence, it is impossible to vary $H$ in any easy fashion.

In order to overcome this difficulty, essentially two alternatives present themselves. In the first place one could alter the field gradient by changing the shape of the pole piece of the solenoid. This method, however, does not adapt itself readily to a continuous variation in the gradient. A second and much more practical method consists of using a multiplicity of coils. If these coils are placed in a symmetrical fashion with respect to a horizontal plane through the point of support, it can easily be shown by simply adding up fields due to all the solenoids, that the field intensity, H, and all even derivatives of H are proportional to the sum of the currents in the coils, and all the odd derivatives are proportional to the difference of these currents. Consider, for example, two coils, one above and one below the point of support. One has the following:

$$H = k_0(J_1 + J_2)$$

$$\frac{dH}{dz} = H^1 = k_1(J_1 - J_2)$$

$$\frac{d^2H}{dz^2} = H^{11} = k_2(J_1 + J_2) \text{ etc.}$$

Where the J's are the current densities in the respective coils and the k's depend upon the geometry involved. Hence by virtue of the first two of these equations, H and $H^1$ are capable of an independent variation.

In prior devices a small pickup coil working on an inductance or loss principle has been used to monitor the vertical position of the supported body and produce a corresponding error signal. However, when the low loss material used in the present rotor being supported becomes saturated, its permeability becomes unity, and its position has very little effect on the inductance of the pickup coil. Hence, in conjunction with the new support system described above it is necessary to revert to an optical type pickup to obtain an adequate position error signal when operating at saturation.

In most modifications of the present invention a spherical rotor is used so that it will present a symmetrical aspect regardless of orientation. However, it is to be understood that in modifications that do not require universal symmetry rotors of other shapes may be used.

Fig. 1 shows schematically the control system for maintaining the position of a body in one dimension. In this system the pairs of coils 11, 12 and 13, 14 are placed equal distances on each side of a ferromagnetic sphere 10 having their common axis along a line passing through the center of the sphere. These coils are controlled by the amplifier 15 as hereinafter described. The input to the amplifier is a signal proportional to the position of the sphere along the axis of the coils derived from the optical sensing system comprising light source 16 and detector 17. Light source 16 contains a lamp 18, whose rays are collimated by lens 19 and pass through slit 20. The beam emerging from slit 20 is partially interrupted by the sphere and focused on a photoelectric cell 22 by lens 21 in detector 17. The output from photoelectric cell 22 varies according to the portion of the light beam obstructed by sphere 10. In order to eliminate any variation in this signal which might be due to changes in the intensity of lamp 18, a second photoelectric cell 23 is positioned so as to receive the light from lamp 18 directly. The output from cell 23 is proportional to the intensity of the light source and, when subtracted from the output from cell 22 provides a signal solely dependent upon the position of sphere 10.

Sphere 10 is shown within an enclosure 25 which is evacuated to eliminate the gaseous friction of the atmosphere. Enclosure 25 may be made of material that will transmit light and not affect the magnetic field, such as glass. With obvious modifications of light source 16 and detector 17, lenses 19 and 21 may be made integral with enclosure 25.

Coils 11 and 14 are connected in series to a source of current in amplifier 15 so that the magnetic field produced by coil 11 is in the same direction as that produced by coil 14. The current in these coils is adjusted to produce a constant field of sufficient intensity to completely saturate the ferromagnetic material of sphere 10.

Coils 12 and 13, which may be called the gradient coils, are connected in series so that the field produced by coil 12 will be equal and opposite to that produced by coil 13. The current in these two coils is controlled by amplifier 15 in accordance with the difference in the intensity of light received by photocells 22 and 23, and is initially adjusted so that when sphere 10 is midway between the coils, no current flows in coils 12 and 13.

It will be seen that, regardless of the direction or magnitude of current in coils 12 and 13, since the fields produced by these coils are equal and opposite, the resultant field at the center of sphere 10 is zero. However, any field produced by coils 12 and 13 will interact with the field produced by coils 11 and 14 to change the gradient at the center of sphere 10, producing a force that will move the sphere up or down depending upon the direction of current in coils 12 and 13. If sphere 10 should move closer to coil 12, the light intensity at photocell 22 increases and the signal provided to amplifier 15 by photocells 22 and 23 changes. This change in signal causes a current to flow in coils 12 and 13 producing a gradient that tends to move the sphere away from coil 12 and back to its initial position.

The above-described arrangement provides only unidimensional control, whereas a proper support for a freely suspended gyroscope requires such control to be exercised in three dimensions. It can be shown that an arrangement wherein three identical control systems disposed along three axes can provide such three-dimensional control action, the three control systems remaining mutually independent. Such a configuration is shown in Fig. 2, wherein coils 11, 12, 13 and 14 are shown arranged along an axis z—z passing through the center of sphere 10. A second group of coils 32, 33, is arranged along a second axis x'—x' in the x—z plane and a third group of coils 42, 43, is arranged along a third axis y'—y' in the y—z plane, axes x'—x' and y'—y' both also passing through the center of sphere 10.

Since the coils 11 and 14 provide the required constant field, only gradient coils are needed along the x'—x' and y'—y' axes.

In determining the proper orientation of the x'—x' and y'—y' axes in order to produce three mutually perpendicular forces, it is discovered that these axes cannot be perpendicular to the z—z axis, since three mutually perpendicular fields produce gradients which give a set of forces that are coplanar. However, two support fields with axes in perpendicular planes and inclined to $\vec{M}$ by the angle $\tan^{-1}\sqrt{2}$ give two forces perpendicular to each other and perpendicular to $\vec{M}$.

Thus, it can be shown that the forces exerted on the sphere by the three sets of coils arranged as shown in Fig. 3, where the angle $\alpha = \tan^{-1}\sqrt{2}$, may be expressed by the following:

$$Fx = Kx \, \vec{Mz}\left(\frac{\partial Hx'}{\partial X'}\right)$$

$$Fy = Ky \, \vec{Mz}\left(\frac{\partial Hy'}{\partial Y'}\right)$$

$$Fz = Kz \, \vec{Mz}\left(\frac{\partial Hz}{\partial Z}\right)$$

where: Fx, Fy, and Fz are the forces along the x, y and z axes respectively;

$\vec{Mz}$ is the fixed magnetic moment per unit of volume due to the effect of the saturating field along the z axis; and $$\frac{\partial Hx'}{\partial X'}, \frac{\partial Hy'}{\partial Y'}, \frac{\partial Hz}{\partial Z}$$

are the axial gradients due to gradient coils along the x'—x', y'—y' and z—z axes respectively, and are proportional to the currents in the respective sets of coils.

It will be seen that light source 16 and detector 17 for control of sphere 10 in the z direction may be located anywhere in the x—y plane, while the sensing means for the x direction and for the y direction must be located in planes perpendicular to the x and y axes respectively.

In order to cause the sphere to act as a gyroscope it is necessary to place it in rotation, and to use the gyroscope it is necessary to be able to determine one's orientation relative to its axis of rotation, which remains fixed in space.

Fig. 1 shows one means used to cause the sphere 10 to rotate. Evacuated enclosure 25 is constructed with a neck 26 containing an electron gun 27 of the type commonly employed in cathode ray tubes which directs a beam of electrons 28 toward the center of sphere 10. The direction of the beam of electrons is controlled by deflection plates 29 so that it will strike sphere 10 tangentially causing it to rotate, in the manner set forth in Patent No. 1,192,706 to Elihu Thompson. Since sphere 10 is frictionlessly suspended, it can attain very high rotational velocities depending only on the velocity of the electron beam and the length of time it is applied. Sphere 10 is initially set in rotation about a predetermined axis 31, for example, an axis parallel to the axis of rotation of the earth. Electron beam 28 is then turned off so it will not affect this rotation, and the sphere will continue to rotate about this axis for many days with little change in speed.

In order to determine the orientation of the axis of rotation, optical detectors 71 as shown in Fig. 1 are arranged to view very small spots on the surface of the sphere along three radii spaced a known angular distance apart. Detector 71 comprises a lens 72 which focuses the surface of sphere 10 on iris 73 having a very small opening 74 therein. A second lens 75 focuses the light passing through opening 74 on photoelectric cell 76.

The only limitations on the positioning of the optical detectors 71 is that there must be at least three of them not all being in the same plane, and none of the detectors should be located on a radius perpendicular to the plane through the other two and the center of the sphere. These detectors may be located to view portions of the surface illuminated by light source 16 as shown in Fig. 1.

There is inscribed on sphere 1 a great circle 30 having different optical properties from the rest of the sphere. This may be done by polishing a very narrow band on a normally dull surface, or providing a dull band on a brightly polished surface. The edges of this band should be as sharp as possible. This band passes through the axis of rotation 31 at both poles.

The passage of band 70 across the field of view of each detector 71 produces a pulse due to the change in light reflected from the surface at that instant. The pulse rate in each detector is twice the rotational frequency, and can be used to determine the rate of rotation. Furthermore, the time interval between a pulse from one detector and that from another, knowing the angular seperation between them, determines a plane in which the axis of rotation must lie. The corresponding time interval for either of the other pairs of detectors determines a second plane, and the interesection of the two planes is the axis of rotation.

The disclosed system can also be used as an accelerometer to determine components of acceleration along each of the three axes of support. It is apparent that if the system remains stationary and the coils 11, 12, 13 and 14 are positioned along the vertical axis, the gradient produced by coils 12 and 13 must be just sufficient to provide a force equal and opposite to the weight of the rotor. Since the weight equals $mg$, and the mass $m$ is constant, the force is proportional to the acceleration of gravity. As previously shown, the force $Fz$ is also proportional to the current in the set of gradient coils along the z—z axis. Thus the current in these coils is proportional to the acceleration imposed along the z—z axis, and an ammeter capable of reading the direction and magnitude of the current can be calibrated to indicate acceleration directly. It is also apparent that an acceleration of the gyroscope system in any direction would require a force in the same direction to maintain sphere 10 centered along the three orthogonal axes. This force will be produced by variations of the currents in the different sets of coils, and can be detected by monitoring the currents, thus indicating the magnitude and direction of the acceleration. The acceleration can easily be measured to the degree of accuracy with which one can measure current.

It will be seen from the above disclosure that a system has been provided which will maintain a body of properly selected material suspended in a vacuum, set it in rotation about any predetermined axis, and determine the orientation of the observer relative to this axis of rotation. Since no forces are present which tend to shift the axis of rotation or slow down the rotation, this system can be used as a gyroscope to determine the observer's orientation relative to the predetermined axis regardless of his location. It should be understood that the foregoing disclosure relates to only a preferred embodiment of the invention and that numerous modifications or alterations may be made therein without departing from the spirit and scope of the invention as set forth in the appended claims.

What is claimed is:

1. An electromagnetic support for maintaining a ferromagnetic body suspended in space comprising a plurality of pairs of coils arranged along an equal plurality of axes which intersect at the center of said body, one coil of each pair being positioned on each side of said body coaxially with each of said axes, means for providing a constant magnetic field throughout the volume of said body to maintain said body in a condition of magnetic saturation, and control means responsive to the movement of said body away from the intersection of said axes for varying the currents in each pair whereby said body is returned to position at said intersection.

2. An electromagnetic support for maintaining a ferromagnetic body suspended in space comprising a pair of saturating coils and a plurality of gradient coils arranged coaxially along axes intersecting at the center of said body, means for energizing said saturating coils to produce a steady magnetic field of sufficient intensity to saturate said body, means for energizing said gradient coils to produce a magnetic field having a gradient over the volume occupied by said body, and means for controlling the energization of said gradient coils in response to a change in the position of said body to produce a force acting on said body in a direction opposite to said change in position.

3. Apparatus for maintaining a ferromagnetic body suspended in space comprising a pair of saturating coils arranged along an axis passing through the center of said body, means for energizing said saturating coils to produce a steady magnetic field of sufficient intensity to magnetically saturate the ferromagnetic material of said body, a plurality of pairs of gradient coils arranged along an equal plurality of axes passing through the center of said body, said axes being arranged so that the axial gradients produced by said gradient coils will act upon said body to produce three mutually perpendicular forces, and means for controlling the energization of said gradient coils in response to changes in position of said body relative to said axes.

4. An electromagnetic support for positioning a body of ferromagnetic material in space comprising a pair of saturating coils arranged along a first axis passing through the center of said body, means for energizing said coils to produce a magnetic field over the volume of said body of sufficient intensity to completely saturate said body, a first pair of gradient coils arranged coaxially with said saturating coils so as to produce a magnetic field gradient along said first axis when energized, said gradient acting upon said body to produce a first force along said axis, and a second pair of gradient coils arranged along a second axis passing through the center of said body so as to produce a gradient along said second axis when energized, said second axis being positioned with respect to said first axis so that the force acting upon said body due to the gradient produced by said second pair of gradient coils is perpendicular to said first axis in the plane of said first and second axes.

5. A device as set forth in claim 4, including a third pair of gradient coils arranged along a third axis passing through the center of said body so as to produce a gradient along said third axis when energized, said third axis being oriented with respect to said first and second axes so that the force acting upon said body due to the gradient produced by said third pair of gradient coils is perpendicular to the forces produced by both said first and second pairs of gradient coils.

6. A device as set forth in claim 5 including means for controlling the energization of each of said pairs of gradient coils in accordance with the position of said body, each pair being energized in proportion to the component of movement of said body away from the intersection of said axes in the direction of the force produced by said pair.

7. A magnetically supported gyroscope comprising a spherical rotor of ferromagnetic material, means for producing a steady magnetic field for saturating said rotor, means for producing a plurality of field gradients along an equal plurality of intersecting axes arranged so that the forces produced by said gradients upon said rotor are mutually perpendicular, means for controlling said gradients in accordance with the position of said rotor relative to said axes, means for rotating said rotor about an axis in space, and means for determining the orientation of said axis of rotation.

8. An electromagnetically supported gyroscope comprising a spherical rotor of ferromagnetic material, means for maintaining said ferromagnetic material in a condition of magnetic saturation, electromagnetic supporting coils arranged on each side of said rotor along each of a plurality of axes intersecting at the center of said rotor, control means responsive to movement of said rotor away from the intersection of the axes for varying the currents in said coils to reposition the center of said rotor at said intersection, means for rotating said rotor and means for determining the orientation of the axis of rotation of said rotor.

9. A magnetically supported gyroscope comprising a spherical ferromagnetic rotor, means for establishing a magnetic field along a first axis passing through the center of said rotor, a first pair of gradient coils arranged along said axis, second and third pairs of gradient coils arranged along second and third axes passing through the center of said rotor and lying in perpendicular planes intersecting along said first axis, said three pairs of gradient coils being arranged to produce when energized three mutually perpendicular forces acting upon said rotor proportional to the axial gradients of the magnetic fields set up by said coils, means for controlling the energization of each pair of coils in proportion to the component of movement of said rotor away from the intersection of said axes in the direction of the force produced by said pair of coils, means for rotating said rotor about an axis fixed in space and means for indicating the orientation of said axis of rotation.

10. An accelerometer comprising a ferromagnetic body, means for producing a steady magnetic field of sufficient intensity to saturate said body, a plurality of coils arranged along axes intersecting at the center of said body to produce a magnetic field gradient controllable in three dimensions over the volume of said body proportional to the currents in said coils, means for controlling said currents in accordance with the position of said body to maintain said body positioned at the intersection of said axes and means for measuring said currents.

11. An accelerometer comprising a body of ferromagnetic material, means for producing a magnetic field along an axis passing through the center of said body, said magentic field being of sufficient intensity to saturate said ferromagnetic material, a first pair of gradient coils arranged along said axis to produce a magnetic field gradient along said axis proportional to the current passing therethrough, said gradient producing a force acting upon said body in a direction parallel to said axis, a second pair of gradient coils arranged along a second axis through the center of said body to produce a magnetic field gradient along said second axis proportional to the current passing therethrough, said second axis being oriented to said first axis at an angle such that the force produced by said second gradient coils acts upon said body in a direction perpendicular to the force produced by said first gradient coils, a third pair of gradient coils arranged along a third axis through the center of said body in a plane perpendicular to the plane of said first and second axes and intersecting said plane along said first axis, said third axis being oriented at an angle to said first axis such that the force produced by the axial magnetic field gradient due to the current in said third pair of coils acts upon said body in a direction perpendicular to the forces produced by said first and second pairs of gradient coils, means for controlling the current in each pair of gradient coils in response to the component of movement of said body parallel to the force produced by its magnetic field gradient, and means for indicating the current in each of said pairs of coils.

References Cited in the file of this patent
UNITED STATES PATENTS

| | | |
|---|---|---|
| 2,377,175 | Peer | May 29, 1945 |
| 2,691,306 | Beams et. al. | Oct. 12, 1954 |
| 2,695,165 | Hansen | Nov. 23, 1954 |
| 2,822,694 | McKenney | Feb. 11, 1958 |